US012745692B2

(12) United States Patent
Wang et al.

(10) Patent No.: US 12,745,692 B2

(45) Date of Patent: Sep. 29, 2026

(54) STRUCTURE FOR TREATING SALINE ALKALI SOIL AND BIOLOGICAL TREATMENT METHOD

(71) Applicant: Harbin Normal University, Harbin City (CN)

(72) Inventors: Hanxi Wang, Harbin City (CN); Lingyun Fan, Harbin City (CN); Shuang Zhao, Harbin City (CN)

(73) Assignee: Harbin Normal University, Harbin City (CN)

( * ) Notice: Subject to any disclaimer, the term of this patent is extended or adjusted under 35 U.S.C. 154(b) by 0 days.

(21) Appl. No.: 19/211,619

(22) Filed: May 19, 2025

(65) Prior Publication Data

US 2025/0280752 A1 Sep. 11, 2025

Related U.S. Application Data

(63) Continuation of application No. PCT/CN2024/135432, filed on Nov. 29, 2024.

(30) Foreign Application Priority Data

Nov. 30, 2023 (CN) ........................ 202311621537.5

(51) Int. Cl.

*A01B 79/02* (2006.01)
*A01B 77/00* (2006.01)
*A01G 24/22* (2018.01)

(52) U.S. Cl.

CPC .............. *A01B 79/02* (2013.01); *A01B 77/00* (2013.01); *A01G 24/22* (2018.02)

(58) Field of Classification Search

CPC ........ A01B 79/00; A01B 79/02; C09K 17/06; C09K 17/40

See application file for complete search history.

(56) References Cited

U.S. PATENT DOCUMENTS 4,687,505 A * 8/1987 Sylling .................... C05G 3/80 106/900
4,923,500 A * 5/1990 Sylling .................... C05G 3/80 106/900

(Continued)

FOREIGN PATENT DOCUMENTS

CN 101659867 A * 3/2010
CN 204498610 U 7/2015

(Continued)

*Primary Examiner* — Michael H Wang

(74) *Attorney, Agent, or Firm* — IPro, PLLC; Na Xu

(57) ABSTRACT

The disclosure provides a structure for treating saline alkali soil and a biological treatment method, relating to the technical field of bioremediation for special soil and solving problems of single existing saline alkali soil improvement method, long improvement period, high cost and poor effect due to a single material. In the disclosure, a collecting layer, impermeable layers, and a plough layer are paved upward from a saline alkali soil layer in sequence. The impermeable layers and the collecting layer are made with a biological material, and the plough layer is improved, which reduces the content of harmful salt in the plough layer and improves the water holding capacity and permeability of soil in the plough layer. A collecting pipe network is buried under the plough layer, and collection pools are arranged at points of the pipe network for salt collection, permanently removing harmful salt components in the saline alkali soil.

7 Claims, 3 Drawing Sheets

(56) References Cited

U.S. PATENT DOCUMENTS

| | | | | | |
|---|---|---|---|---|---|
| 5,106,406 | A * | 4/1992 | Sylling | C05G 3/80 |
| | | | | 47/57.6 |
| 9,776,225 | B2 * | 10/2017 | Myre | B09C 1/02 |
| 10,835,938 | B1 * | 11/2020 | Lu | B09C 1/02 |
| 2021/0032538 | A1 * | 2/2021 | Cheng | C09K 17/04 |

FOREIGN PATENT DOCUMENTS

| | | | | | |
|---|---|---|---|---|---|
| CN | 106105461 | A | | 11/2016 | |
| CN | 109042001 | A | * | 12/2018 | A01G 24/15 |
| CN | 110066662 | A | | 7/2019 | |
| CN | 212487133 | U | | 2/2021 | |
| CN | 114059411 | A | | 2/2022 | |
| CN | 217656989 | U | * | 10/2022 | |
| CN | 117796305 | A | * | 4/2024 | C09K 17/06 |
| CN | 121926013 | A | * | 4/2026 | A01B 79/00 |
| EP | 3932896 | A1 | | 1/2022 | |
| WO | WO-2019053301 | A1 | * | 3/2019 | C05G 3/80 |

* cited by examiner

STRUCTURE FOR TREATING SALINE ALKALI SOIL AND BIOLOGICAL TREATMENT METHOD

TECHNICAL FIELD

The disclosure relates to the technical field of bioremediation of special soil, and particularly to a structure for treating saline alkali soil and a biological treatment method.

BACKGROUND

A large area and a wide distribution range of saline alkali soil in China are one of major factors that restrict the development of agriculture and animal husbandry. There are certain differences in the degree of salinization of the saline alkali soil in different regions. Besides, the saline alkali soil in China is thicker. Salts of the saline alkali soil in the lower layer move upwards continuously due to the capillary phenomenon, which accelerates deterioration of the soil in the surface plough layer and increases the difficulty of treating the saline alkali soil. Saline alkali soil treatment methods mainly include methods such as phytoremediation, microbial remediation, and improvement by soil additives, which have the problems of long treatment period, poor effect, high cost, and low industrial value. Therefore, to develop a novel efficient comprehensive biological treatment method is of great significance in improving the saline alkali soil.

At present, the saline alkali soil improvement methods are single, long in improvement period, and high in cost. Particularly, the lower saline alkali soil moves upwards to lead to repeated salinization of the upper plough layer, which results in that the saline alkali soil cannot be improved thoroughly. To conduct saline alkali soil improvement and salt extraction and utilization contributes to change the current situation of the saline alkali soil thoroughly. At present, methods for treating the saline alkali soil are mainly methods of adding conditioners such as organic fertilizers, bacterial fertilizers, compound fertilizers, biochar, and biological bacteria into the saline alkali soil. These methods improve the saline alkali soil from the perspectives of soil improvers, phytoremediation, salt separation layer preparation and the like, so that the amount of soda alkali in the soil is reduced. However, there are still problems that the cost is high due to a larger amount of biochar consumed in the impermeable layers, anti-seepage effect is poor due to a single material, a failure probability in an application process is large, and the cost is high. Besides, the salt content in the upper plough layer is reduced slowly, resulting in problems such as inability to achieve rapid remediation, low economic value, and large carbon emission, which affects the improvement effect of saline alkali soil and the growth of crops.

SUMMARY

To solve above mentioned problems of single existing saline alkali soil improvement method, long improvement period, high cost and poor effect due to a single material, the disclosure provides a structure for treating saline alkali soil and a biological treatment method. A comprehensive treatment method for improving the upper plough layer, preventing seepage in the lower part, and collecting salts in the upper plough layer and the lower saline alkali soil layer used in the disclosure effectively reduces the contents of salts harmful to plants such as chloride salts, sulfates, and carbonates in the upper plough layer, and improves the water holding (retaining) capacity and air permeability (looseness) of the soil in the plough layer, so that plants grow rapidly. Moreover, a collecting pipe network and collection pools are arranged to collect the salts to achieve resource utilization, which achieves an effect of permanently removing harmful salt components in the saline alkali soil.

The disclosure provides a structure for treating saline alkali soil, specifically including a plough layer, impermeable layers, a collecting layer, and a saline alkali soil layer, where the collecting layer is paved on the saline alkali soil layer, the collecting layer is provided with a pipe network slot, and a collecting pipe network is arranged in the pipe network slot; the impermeable layers are paved in an area corresponding to meshes of the collecting pipe network on the collecting layer, and the plough layer is paved on the impermeable layers and the collecting pipe network; the thickness of the impermeable layer in each of the meshes is great in the middle and small in the periphery, with a slope surface inclining toward the collecting pipe network; a collection pool is arranged in the collecting pipe network at an interval of every two adjacent mesh points, the collection pools are arranged at positions of the mesh points, and the plurality of collection pools are communicated with the collecting pipe network; and an inner side wall of the collection pool is subjected to anti-seepage treatment, and the upper end of the collection pool passes through the plough layer and is opened.

Further, the collecting pipe network includes a plurality of collecting pipes, a part of the collecting pipes are transversely arranged, the other part of the collecting pipes are longitudinally arranged, and the transversely arranged collecting pipes and the longitudinally arranged collecting pipes are connected; the spacing between two adjacent transverse collecting pipes is 3.0-5.0 m, and the spacing between two adjacent longitudinal collecting pipes is 6.0-10.0 m; the transverse spacing between two adjacent collection pools is 6.0-10.0 m, and the longitudinal spacing thereof is 12-20 m; and axes of the collecting pipes and the highest points of the impermeable layers are located in a same horizontal plane.

Further, the collecting pipe is a screen pipe made from polyvinyl chloride, the diameter is 100-200 mm, the pore diameter of a screen pipe wall is 8-15 mm, and the hole spacing is 5-8 mm; and a nylon net I coats the screen pipe, and the pore diameter of the nylon net I is 2-5 mm.

Further, the impermeable layer has a slope toward a direction of the collecting pipe, with the slope being 0.5-1.5‰.

Further, an impermeable underlayment is arranged between the collecting pipe and the collecting layer, and both sides of the impermeable underlayment are in lap joint with the impermeable layer, with a lap joint length of 0.5-1.5 m.

Further, the impermeable underlayment is a sodium bentonite waterproof blanket, with a specification of 4000-5500 $g/m^2$.

Further, the side length of the collection pool is 1.5-2.5 m, and the pool depth is 1.0-2.0 m; and the thickness of the plough layer is 300-600 mm.

A biological treatment method using the above structure for treating saline alkali soil, including the following steps: piling a cleaned plough layer to one side, then paving a collecting layer and impermeable layers in sequence, and paving a collecting pipe network and collection pools in the meantime; the impermeable layers being prepared by mixing biochar powder, sodium bentonite, calcium bentonite, coal ash, and saline alkali soil and adding water for humidifying till the water content is 25-35%, and paving the above uniformly mixed components in layers and grinding the same, where the paving thickness of the first layer is 80-100 mm, and then the thickness of each layer is 40-50 mm, totaling 2-3 layers; incorporating straw particles, straw biochar particles, zeolite, and diatomaceous earth into the plough layer and restoring the plough layer to an original position; when the impermeable layers are subjected to leakage after the collecting layer operates 5 years or more, taking out the collecting layer and placing the collecting layer in clean water to be soaked for 12-24 h, cleaning the collecting layer, and airing the solution and cleaning solution after soaking, evaporating and concentrating salt crystals, and collecting the salt crystals; collecting the liquid in the collection pool every 2 months from March to October; and filtering the collected liquid first, and then evaporating, concentrating, and crystallizing the liquid.

Further, the particle diameter of the straw particles incorporated into the plough layer is 10-20 mm, with an incorporating amount of 0.15-0.3 kg/m$^2$; the particle diameter of the straw biochar particles is 1.0-5.0 mm, with an incorporation ratio of 2.0-5.0%; the particle diameter of zeolite is 1.0-5.0 mm, and the particle diameter of diatomaceous earth is 0.1-1.5 mm; and the adding amounts of zeolite and diatomaceous earth are respectively 0.5-5.0% and 0.5-3.0% based on the total mass of the soil in the plough layer.

Further, a raw material of the straw biochar particles is one of or more mixture of skin of corn straws, skin of sorghum straws, sesame straws, cotton straws, sunflower straws, and soybean straws.

Further, the mixing mass ratio of the biochar powder, sodium bentonite, calcium bentonite, coal ash, and saline alkali soil in the impermeable layers is 3:0.5:1.0:2.0:93.5-6.5:1.5:3.5:6.5:82; the viscosity of sodium bentonite is greater than 60 mPa·s, the residue on sieve of 75 μm particle diameter is less than 1.5%, and the filter loss is less than 14 cm$^3$; the fineness of coal ash is less than 30%, and the ignition loss is less than 8.0%; and the total mass fraction of silicon dioxide, aluminum oxide, and ferric oxide in the coal ash is greater than 70%, the mass fraction of free calcium oxide is less than 4%, and the mass fraction of sulfur trioxide is less than 3%.

Further, the biochar powder raw material is one of or more mixture of pulp of corn straws, straw stalks, and wheat straws.

Further, the grinding pressure of the impermeable layer is 50-150 kPa, and the compacting factor thereof is 0.92-0.96.

Further, the collecting layer is formed by a nylon net II and a filler, the filler is placed in the nylon net II, the pore diameter of the nylon network II is 2-4 mm, and the paving thickness of the filler is 50-100 mm; and the filler is biochar with the particle diameter of 5-15 mm, and the biochar raw material is wood.

A method for preparing straw biochar particles for the above biological treatment method, including the following step: preparing the straw biochar particles by pyrolyzing one of or more mixture of skin of corn straws, skin of sorghum straws, sesame straws, cotton straws, sunflower straws, and soybean straws at 400-600° C. for 1.0-3.0 h.

A method for preparing biochar powder for the above biological treatment method, including the following steps: preparing the biochar powder by pyrolyzing one of or more mixture of pulp of corn straws, straw stalks, and wheat straws at 350-550° C. for 1.0-3.5 h, crushing the biochar powder till the particle diameter is less than 0.5 mm, incorporating 15-35% woody biochar into the biochar powder, screening the biochar powder, and mixing the biochar powder with charcoal powder with the particle diameter being less than 0.5 mm, where the woody biochar is prepared by pyrolyzing wood at 450-550° C. for 1.5-2.0 h.

A method for preparing the filler for the above biological treatment method, including the following steps: preparing a raw material of the filler biochar in the collecting layer first by pyrolyzing at 550-650° C. for 1.5-2.5 h; then, modifying the raw material with 0.05-0.2 mol/L potassium hydroxide for 24-48 h and cleaning the raw material to be neutral, and modifying the raw material with a mixed solution of 0.001-0.05 mol/L potassium permanganate and 0.005-0.05 mol/L nitric acid for 24-72 h, cleaning the raw material thoroughly, and drying the raw material; and finally, soaking the raw material in a mixed liquid of 1.5-6.5% of sodium bentonite and 1.0-4.0% of calcium bentonite for 20-50 h, and cleaning and drying the raw material to prepare the filler.

A structure for treating saline alkali soil and a biological treatment method provided by the disclosure have the following beneficial effects:

(1) according to a structure for treating saline alkali soil and a biological treatment method provided by the disclosure, a biological material compound preparation is used as the permeable layer material; a cohesive body is formed by means of interactions between the biochar powder with a high ash content and clay particles in sodium bentonite, calcium bentonite, coal ash, and saline alkali soil; under the grinding action, the anti-seepage capacity, strength, and plasticity are significantly improved; the tested osmotic coefficient is lower than $5\times10^{-11}$ m/s, and root systems of plants hardly damage the layer; because the use level of added materials is low, and the added materials are conventional materials, so that the cost is low; the permeable layers are good in durability, the anti-seepage capacity of the permeable layers of the soil is increased by 2-3 times compared with that in a conventional method using only biochar, the cost is reduced by 50%, the durability is improved by 1 time or more, and the saline alkali soil layer is effectively prevented from moving upward, so that the salt content in the plough layer is continuously reduced, and it is guaranteed that the soil in the layer is effectively improved;

(2) according to a structure for treating saline alkali soil and a biological treatment method provided by the disclosure, salts in the upper plough layer and the lower saline alkali soil layer are collected by arranging the collecting pipe network and the collection pools, so that harmful salts are permanently removed; recovery in the collecting layer is after a long-term operation (5 years or more); when the permeable layers fail and are remediated, adsorbed and crystallized salts in the collecting layer are recovered as an industrial production raw material; the collecting layer has physical and chemical adsorptive action on salt components included in the soil, so that the collecting layer is strong in effect of removing the salts in the soil; the method effectively remediates the saline alkali soil by using the cheap biomass material without bringing new pollutants; and the salts are collected with relatively high economic benefits, so that the problem that industrial production related raw materials are short is solved; and (3) according to a structure for treating saline alkali soil and a biological treatment method provided by the disclosure, the plough layer is improved by using the compound conditioners (straw particles, straw biochar particles, zeolite particles, and diatomaceous earth particles), and the water retaining property, permeability, and the organic matter content of the soil are improved, which further contributes to growth of plants; under the action of rainfall, the salts in the plough layer are collected through the pipelines and the collection pools, so that the salt content in the soil is reduced rapidly; the saline alkali soil in the plough layer is treated with a comprehensive method which solves the technical problem that the removal efficiency of salts in the saline alkali soil with different degrees of salinization is low, the salt content in the soil is reduced, and the air permeability and the water retaining capacity of the soil are improved; under the action of rainfall for two years, the harmful salt content in the soil is reduced by over 80%, the water retaining capacity is improved by 30%, and the air permeability (permeability) of the soil is improved by 70% or more.

BRIEF DESCRIPTION OF FIGURES

The drawings forming a part of this application serve to provide a further understanding of the disclosure, and the illustrative examples of the disclosure and the description of the illustrative embodiments serve to explain the disclosure and are not to be construed as unduly limiting the disclosure.

In the drawings.

Figure 1:
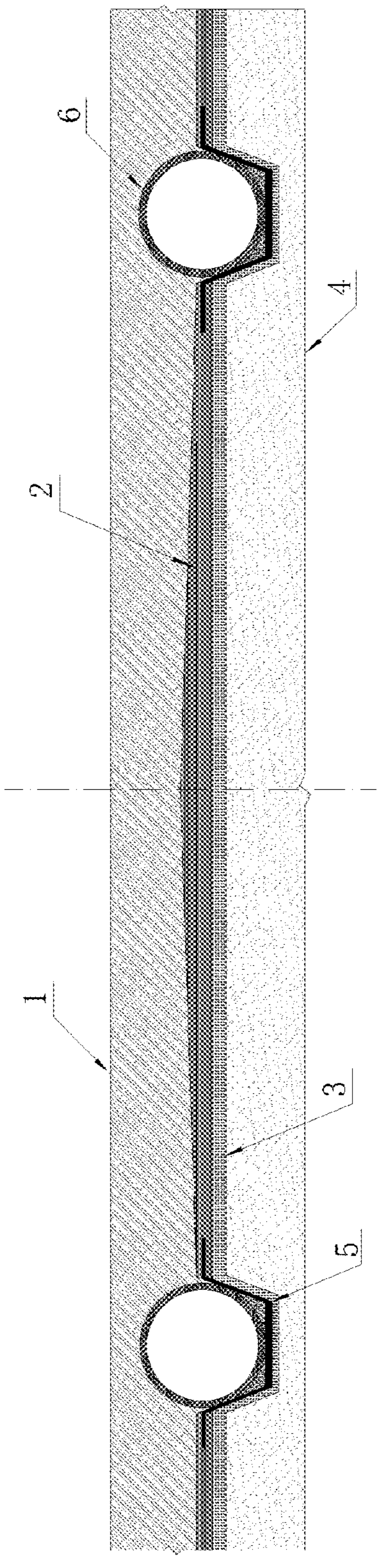
FIG. 1 is a sectional layout diagram of a structure for treating saline alkali soil provided by the disclosure.

in the drawings, 1-plough layer; 2-permeable layer; 3-collecting layer; 4-saline alkali soil layer; 5-impermeable underlayment; 6-collecting pipe; 7-collection pool; and 8-permeable side wall.

DETAILED DESCRIPTION

Specific embodiments of the disclosure will be further described in detail below in conjunction with drawings.

Specific Embodiment I

Figure 2:
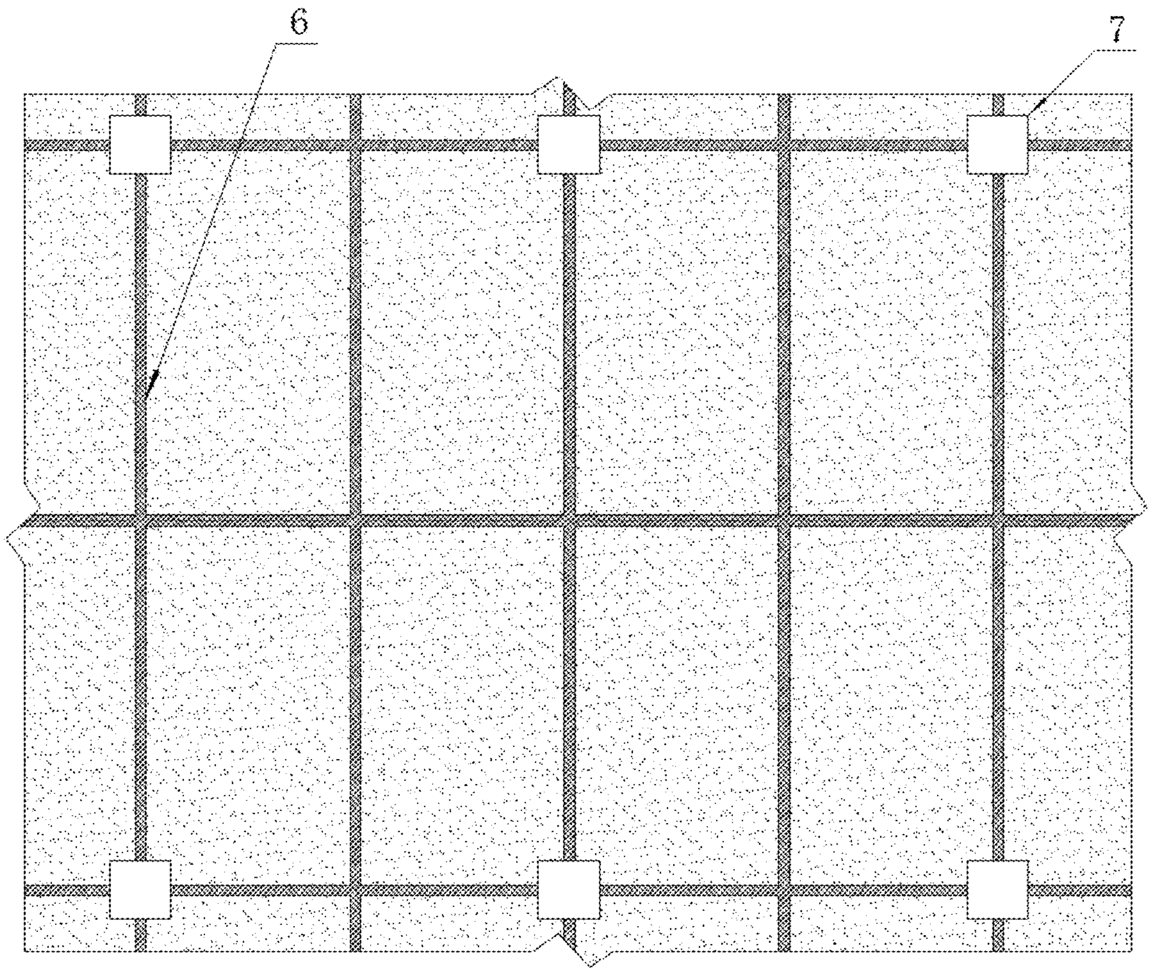
FIG. 2 is a layout plan of a structure for treating saline alkali soil provided by the disclosure.
Figure 3:
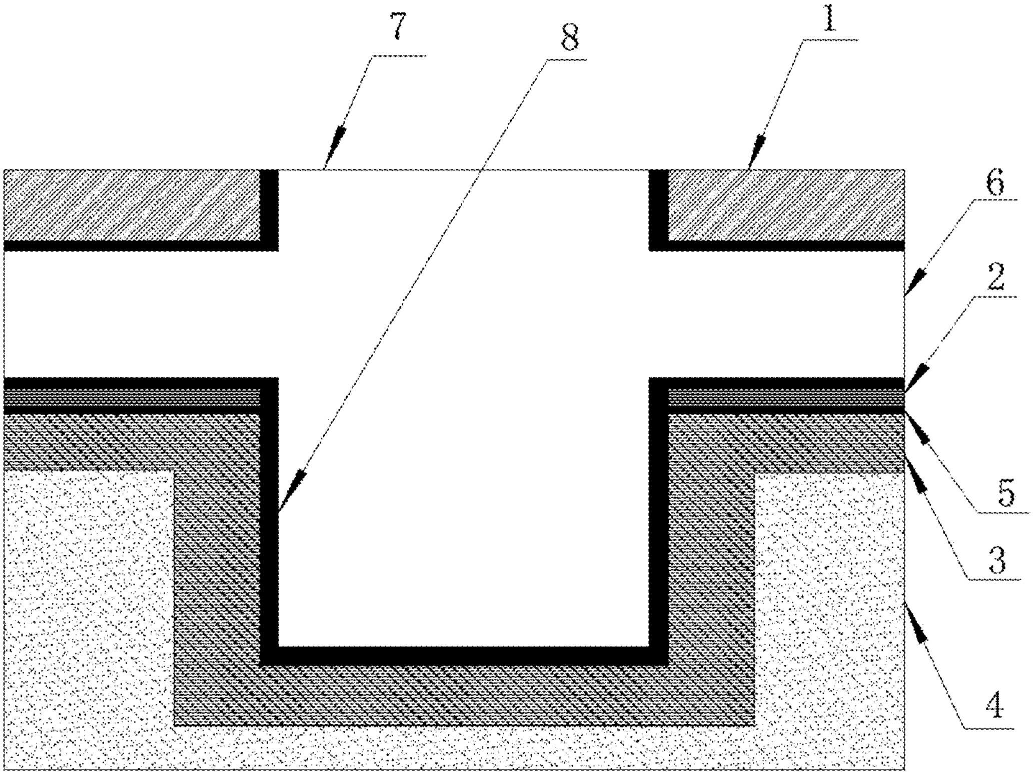
FIG. 3 is a sectional layout diagram of a collection pool of a structure for treating saline alkali soil provided by the disclosure.

The embodiment is specifically described with reference to FIGS. 1-3. A structure for treating saline alkali soil described in the embodiment specifically includes a plough layer 1, impermeable layers 2, a collecting layer 3, and a saline alkali soil layer 4, where the collecting layer 3 is paved on the saline alkali soil layer 4, the collecting layer 3 is provided with a pipe network slot, and a collecting pipe network is arranged in the pipe network slot; the impermeable layers 2 are paved in an area corresponding to meshes of the collecting pipe network on the collecting layer 3, and the plough layer 1 is paved on the impermeable layers 2 and the collecting pipe network; the thickness of the impermeable layer 2 in each of the meshes is great in the middle and small in the periphery, with a slope surface inclining toward the collecting pipe network; a collection pool 7 is arranged in the collecting pipe network at an interval of every two adjacent mesh points, the collection pools 7 are arranged at positions of the mesh points, and the plurality of collection pools 7 are communicated with the collecting pipe network; and an inner side wall 8 of the collection pool 7 is subjected to anti-seepage treatment, and the upper end of the collection pool passes through the plough layer 1 and is opened.

The collecting pipe network includes a plurality of collecting pipes 6, a part of the collecting pipes 6 are transversely arranged, the other part of the collecting pipes 6 are longitudinally arranged, and the transversely arranged collecting pipes 6 and the longitudinally arranged collecting pipes 6 are connected; the spacing between two adjacent transverse collecting pipes 6 is 3.0 m, and the spacing between two adjacent longitudinal collecting pipes 6 is 6.0 m; the transverse spacing between two adjacent collection pools 7 is 6.0 m, and the longitudinal spacing thereof is 12 m; and the collecting pipes 6 are embedded, and axes of the collecting pipes 6 and the highest points of the impermeable layers 2 are located in a same horizontal plane.

The collecting pipe 6 is a screen pipe made from polyvinyl chloride (PVC), the diameter is 100 mm, the pore diameter of a screen pipe wall is 8 mm, and the hole spacing is 5 mm; and a nylon net I coats the screen pipe, and the pore diameter of the nylon net I is 2 mm.

The impermeable layer 2 has a slope toward a direction of the collecting pips 6, with the slope being 0.5‰.

An impermeable underlayment 5 is arranged between the collecting pipe 6 and the collecting layer 3, and both sides of the impermeable underlayment 5 are in lap joint with the impermeable layer 2, with a lap joint length of 0.5 m; and the impermeable underlayment 5 is a sodium bentonite waterproof blanket, with a specification of 4000 $g/m^2$.

The side length of the collection pool 7 is 1.5 m, and the pool depth is 2.0 m; and the thickness of the plough layer 1 is 300 mm.

A biological treatment method using the above structure for treating saline alkali soil includes the following steps: a cleaned plough layer 1 was piled to one side, then a collecting layer 3 and impermeable layers 2 were paved in sequence, and a collecting pipe network and collection pools 7 were paved in the meantime; the impermeable layers 2 were prepared by mixing biochar powder, sodium bentonite, calcium bentonite, coal ash, and saline alkali soil and water was added for humidifying till the water content was 25%, and the above uniformly mixed components were paved in layers and ground, where the paving thickness of the first layer was 80 mm, and then the thickness of each layer was 40 mm, totaling 2 layers; straw particles, straw biochar particles, zeolite, and diatomaceous earth were incorporated into the plough layer 1 and the plough layer was restored to an original position; when the impermeable layers 2 were subjected to leakage after the collecting layer 3 operated 5 years or more, the collecting layer 3 was taken out and the collecting layer was placed in clean water to be soaked for 12 h, the collecting layer 3 was cleaned, and the solution and cleaning solution were aired after soaking, salt crystals were evaporated and concentrated, and the salt crystals were collected; the liquid in the collection pool 7 was collected every 2 months from March to October; and the collected liquid was filtered first, and then the liquid was evaporated, concentrated, and crystallized.

The particle diameter of the straw particles incorporated into the plough layer 1 is 10-20 mm, with an incorporating amount of 0.15 $kg/m^2$; the particle diameter of the straw biochar particles is 1.0-5.0 mm, with an incorporation ratio of 2.0% in the plough layer 1; the particle diameter of zeolite is 1.0-5.0 mm, and the particle diameter of diatomaceous earth is 0.1-1.5 mm; and the adding amounts of zeolite and diatomaceous earth are respectively 0.5% and 3.0% based on the total mass of the soil in the plough layer 1.

A raw material of the straw biochar particles is skin of corn straws.

The mixing mass ratio of the biochar powder, sodium bentonite, calcium bentonite, coal ash, and saline alkali soil in the impermeable layers 2 is 3:0.5:1.0:2.0:93.5; the viscosity (600 r/min) of sodium bentonite is greater than 60 mPa·s, the residue on sieve of 75 μm particle diameter is less than 1.5%, and the filter loss is less than 14 $cm^3$, and the viscosity is measured at a rotating speed of 600 r/min through a test instrument; the fineness of coal ash measured by a 45 μm square hole residue on sieve method is less than 30%, and the ignition loss is less than 8.0%; and the total mass fraction of silicon dioxide ($SiO_2$), aluminum oxide, and ferric oxide in the coal ash is greater than 70%, the mass fraction of free calcium oxide is less than 4%, and the mass fraction of sulfur trioxide is less than 3%.

The biochar powder raw material is pulp of corn straws.

The grinding pressure of the impermeable layer 2 is 50 kPa, and the compacting factor thereof is 0.92-0.93.

The collecting layer 3 is formed by a nylon net II and a filler, the filler is placed in the nylon net II, the pore diameter of the nylon network II is 2-4 mm, and the paving thickness of the filler is 50 mm; and the filler is biochar with the particle diameter of 5-15 mm, and the biochar raw material is branches.

A method for preparing straw biochar particles for the above biological treatment method includes the following step: skin of corn straws was pyrolyzed at 400° C. for 3.0 h.

A method for preparing biochar powder for the above biological treatment method includes the following steps: the biochar powder was prepared by pyrolyzing pulp of corn straws at 350° C. for 3.5 h, the biochar powder was crushed till the particle diameter was less than 0.5 mm, 15% woody biochar was incorporated into the biochar powder, the biochar powder was screened, and the biochar powder was mixed with charcoal powder with the particle diameter being less than 0.5 mm, where the woody biochar was prepared by pyrolyzing branches at 450° C. for 2.0 h.

A method for preparing the filler for the above biological treatment method includes the following steps: a raw material of the filler biochar in the collecting layer 3 was prepared first by pyrolyzing branches at 550° C. for 2.5 h; then, the raw material was modified with 0.05 mol/L potassium hydroxide for 48 h and the raw material was cleaned to be neutral, and the raw material was modified with a mixed solution of 0.001 mol/L potassium permanganate and 0.005 mol/L nitric acid for 72 h, the raw material was cleaned thoroughly, and the raw material was dried; and finally, the raw material was soaked in a mixed liquid of 1.5% of sodium bentonite and 4.0% of calcium bentonite for 20 h, and the raw material was cleaned and dried to prepare the filler.

With adoption of the solution in the embodiment, the water content of the soil is increased by 45.6%, the permeability (air permeability) of the soil is improved by 1 time, and the total salt content in the first year is decreased by 45.2%; the total salt content in the second year is decreased by 86.3% of an initial value, aboveground vegetations flourish, and the annual biomass is increased by 2 times or more; the osmotic coefficient of the impermeable layers 2 is less than $5\times10^{-11}$ m/s, and the anti-seepage capacity is strong; and the collection volume of salts (chloride salts, carbonates, and sulfates) by the collection pool 7 is 165 kg/1000 $m^2$, so that resource utilization is achieved.

Specific Embodiment II

The embodiment is specifically described with reference to FIGS. 1-3. A structure for treating saline alkali soil described in the embodiment specifically includes a plough layer 1, impermeable layers 2, a collecting layer 3, and a saline alkali soil layer 4, where the collecting layer 3 is paved on the saline alkali soil layer 4, the collecting layer 3 is provided with a pipe network slot, and a collecting pipe network is arranged in the pipe network slot; the impermeable layers 2 are paved in an area corresponding to meshes of the collecting pipe network on the collecting layer 3, and the plough layer 1 is paved on the impermeable layers 2 and the collecting pipe network; the thickness of the impermeable layer 2 in each of the meshes is great in the middle and small in the periphery, with a slope surface inclining toward the collecting pipe network; a collection pool 7 is arranged in the collecting pipe network at an interval of every two adjacent mesh points, the collection pools 7 are arranged at positions of the mesh points, and the plurality of collection pools 7 are communicated with the collecting pipe network; and an inner side wall 8 of the collection pool 7 is subjected to anti-seepage treatment, and the upper end of the collection pool passes through the plough layer 1 and is opened.

The collecting pipe network includes a plurality of collecting pipes 6, a part of the collecting pipes 6 are transversely arranged, the other part of the collecting pipes 6 are longitudinally arranged, and the transversely arranged collecting pipes 6 and the longitudinally arranged collecting pipes 6 are connected; the spacing between two adjacent transverse collecting pipes 6 is 5.0 m, and the spacing between two adjacent longitudinal collecting pipes 6 is 10.0 m; the transverse spacing between two adjacent collection pools 7 is 10.0 m, and the longitudinal spacing thereof is 20 m; and the collecting pipes 6 are embedded, and axes of the collecting pipes 6 and the highest points of the impermeable layers 2 are located in a same horizontal plane.

The collecting pipe 6 is a screen pipe made from polyvinyl chloride (PVC), the diameter is 200 mm, the pore diameter of a screen pipe wall is 15 mm, and the hole spacing is 8 mm; and a nylon net I coats the screen pipe, and the pore diameter of the nylon net I is 5 mm.

The impermeable layer 2 has a slope toward a direction of the collecting pipe 6 with the slope being 1.5‰.

An impermeable underlayment 5 is arranged between the collecting pipe 6 and the collecting layer 3, and both sides of the impermeable underlayment 5 are in lap joint with the impermeable layer 2 with a lap joint length of 1.5 m; and the impermeable underlayment 5 is a sodium bentonite waterproof blanket, with a specification of 5500 g/$m^2$.

The side length of the collection pool 7 is 2.5 m, and the pool depth is 1.0 m; and the thickness of the plough layer 1 is 600 mm.

A biological treatment method using the above structure for treating saline alkali soil includes the following steps: a cleaned plough layer 1 was piled to one side, then a collecting layer 3 and impermeable layers 2 were paved in sequence, and a collecting pipe network and collection pools 7 were paved in the meantime; the impermeable layers 2 were prepared by mixing biochar powder, sodium bentonite, calcium bentonite, coal ash, and saline alkali soil and water was added for humidifying till the water content was 35%, and the above uniformly mixed components were paved in layers and ground, where the paving thickness of the first layer was 100 mm, and then the thickness of each layer was 50 mm, totaling 3 layers; straw particles, straw biochar particles, zeolite, and diatomaceous earth were incorporated into the plough layer 1 and the plough layer was restored to an original position; when the impermeable layers 2 were subjected to leakage after the collecting layer 3 operated 5 years or more, the collecting layer 3 was taken out and the collecting layer was placed in clean water to be soaked for 24 h, the collecting layer 3 was cleaned, and the solution and cleaning solution were aired after soaking, salt crystals were evaporated and concentrated, and the salt crystals were collected; the liquid in the collection pool 7 was collected every 2 months from March to October; and the collected liquid was filtered first, and then the liquid was evaporated, concentrated, and crystallized.

The particle diameter of the straw particles incorporated into the plough layer 1 is 10-20 mm, with an incorporating amount of 0.3 kg/m$^2$; the particle diameter of the straw biochar particles is 1.0-5.0 mm, with an incorporation ratio of 5.0% in the plough layer 1; the particle diameter of zeolite is 1.0-5.0 mm, and the particle diameter of diatomaceous earth is 0.1-1.5 mm; and the adding amounts of zeolite and diatomaceous earth are respectively 5% and 0.5% based on the total mass of the soil in the plough layer 1.

A raw material of the straw biochar particles is skin of corn straws and skin of sorghum straws.

The mixing mass ratio of the biochar powder, sodium bentonite, calcium bentonite, coal ash, and saline alkali soil in the impermeable layers 2 is 6.5:1.5:3.5:6.5:82; the viscosity of sodium bentonite is greater than 60 mPa·s, the residue on sieve of 75 μm particle diameter is less than 1.5%, and the filter loss is less than 14 cm$^3$, and the viscosity is measured at a rotating speed of 600 r/min through a test instrument; the fineness of the coal ash is less than 30%, the ignition loss is less than 8.0%, and the fineness of the coal ash is measured by a 45 μm square hole residue on sieve method; and the total mass fraction of silicon dioxide ($SiO_2$), aluminum oxide, and ferric oxide in the coal ash is greater than 70%, the mass fraction of free calcium oxide is less than 4%, and the mass fraction of sulfur trioxide is less than 3%.

The biochar powder raw material is a mixture of pulp of corn straws and straw stalks.

The grinding pressure of the impermeable layer 2 is 150 kPa, and the compacting factor thereof is 0.94-0.96.

The collecting layer 3 is formed by a nylon net II and a filler, the filler is placed in the nylon net II, the pore diameter of the nylon network II is 2-4 mm, and the paving thickness of the filler is 100 mm; and the filler is biochar with the particle diameter of 5-15 mm, and the biochar raw material is wood.

A method for preparing straw biochar particles for the above biological treatment method includes the following step: the mixture of skin of corn straws and skin of sorgum straws was pyrolyzed at 600° C. for 1.0 h.

A method for preparing biochar powder for the above biological treatment method includes the following steps: the biochar powder was prepared by pyrolyzing the mixture of pulp of corn straws and straw stalks at 550° C. for 1.0 h, the biochar powder was crushed till the particle diameter was less than 0.5 mm, 35% woody biochar was incorporated into the biochar powder, the biochar powder was screened, and the biochar powder was mixed with charcoal powder with the particle diameter being less than 0.5 mm, where the woody biochar was prepared by pyrolyzing wood at 550° C. for 1.5 h.

A method for preparing the filler for the above biological treatment method includes the following steps: a raw material of the filler biochar in the collecting layer 3 was prepared first by pyrolyzing wood at 650° C. for 1.5 h; then, the raw material was modified with 0.2 mol/L potassium hydroxide for 24 h and the raw material was cleaned to be neutral, and the raw material was modified with a mixed solution of 0.05 mol/L potassium permanganate and 0.05 mol/L nitric acid for 24 h, the raw material was cleaned thoroughly, and the raw material was dried; and finally, the raw material was soaked in a mixed liquid of 6.5% of sodium bentonite and 1.0% of calcium bentonite for 50 h, and the raw material was cleaned and dried to prepare the filler.

With adoption of the solution in the embodiment, the water content of the soil is increased by 55.2%, the permeability (air permeability) of the soil is increased by 1.5 times, and the total salt content in the first year is decreased by 38.2%; the total salt content in the second year is decreased by 82.7% of an initial value, aboveground vegetations flourish, and the annual biomass is increased by 2 times or more; the osmotic coefficient of the impermeable layers 2 is less than $4\times10^{-11}$ m/s, and the anti-seepage capacity is strong; and the collection volume of salts (chloride salts and carbonates) by the collection pool 7 is 185 kg/1000 m$^2$, so that resource utilization is achieved.

Specific Embodiment III

The embodiment is specifically described with reference to FIGS. 1-3. A structure for treating saline alkali soil described in the embodiment specifically includes a plough layer 1, impermeable layers 2, a collecting layer 3, and a saline alkali soil layer 4, where the collecting layer 3 is paved on the saline alkali soil layer 4, the collecting layer 3 is provided with a pipe network slot, and a collecting pipe network is arranged in the pipe network slot; the impermeable layers 2 are paved in an area corresponding to meshes of the collecting pipe network on the collecting layer 3, and the plough layer 1 is paved on the impermeable layers 2 and the collecting pipe network; the thickness of the impermeable layer 2 in each of the meshes is great in the middle and small in the periphery, with a slope surface inclining toward the collecting pipe network; a collection pool 7 is arranged in the collecting pipe network at an interval of every two adjacent mesh points, the collection pools 7 are arranged at positions of the mesh points, and the plurality of collection pools 7 are communicated with the collecting pipe network; and an inner side wall 8 of the collection pool 7 is subjected to anti-seepage treatment, and the upper end of the collection pool passes through the plough layer 1 and is opened.

The collecting pipe network includes a plurality of collecting pipes 6, a part of the collecting pipes 6 are transversely arranged, the other part of the collecting pipes 6 are longitudinally arranged, and the transversely arranged collecting pipes 6 and the longitudinally arranged collecting pipes 6 are connected; the spacing between two adjacent transverse collecting pipes 6 is 4 m, and the spacing between two adjacent longitudinal collecting pipes 6 is 8 m; the transverse spacing between two adjacent collection pools 7 is 8.0 m, and the longitudinal spacing thereof is 16 m; and the collecting pipes 6 are embedded, and axes of the collecting pipes 6 and the highest points of the impermeable layers 2 are located in a same horizontal plane.

The collecting pipe 6 is a screen pipe made from polyvinyl chloride (PVC), the diameter is 150 mm, the pore diameter of a screen pipe wall is 10 mm, and the hole spacing is 7 mm; and a nylon net I coats the screen pipe, and the pore diameter of the nylon net I is 3 mm.

The impermeable layer 2 has a slope toward a direction of the collecting pipe 6, with the slope being 1.5‰.

An impermeable underlayment 5 is arranged between the collecting pipe 6 and the collecting layer 3, and both sides of the impermeable underlayment 5 are in lap joint with the impermeable layer 2, with a lap joint length of 0.8 m; and the impermeable underlayment 5 is a sodium bentonite waterproof blanket, with a specification of 5000 g/m$^2$.

The side length of the collection pool 7 is 2.0 m, and the pool depth is 1.5 m; and the thickness of the plough layer 1 is 500 mm.

A biological treatment method using the above structure for treating saline alkali soil includes the following steps: a cleaned plough layer 1 was piled to one side, then a collecting layer 3 and impermeable layers 2 were paved in sequence, and a collecting pipe network and collection pools 7 were paved in the meantime; the impermeable layers 2 were prepared by mixing biochar powder, sodium bentonite, calcium bentonite, coal ash, and saline alkali soil and water was added for humidifying till the water content was 30%, and the above uniformly mixed components were paved in layers and ground, where the paving thickness of the first layer was 90 mm, and then the thickness of each layer was 45 mm, totaling 2 layers; straw particles, straw biochar particles, zeolite, and diatomaceous earth were incorporated into the plough layer 1 and the plough layer was restored to an original position; when the impermeable layers 2 were subjected to leakage after the collecting layer 3 operated 5 years or more, the collecting layer 3 was taken out and the collecting layer was placed in clean water to be soaked for 16 h, the collecting layer 3 was cleaned, and the solution and cleaning solution were aired after soaking, salt crystals were evaporated and concentrated, and the salt crystals were collected; the liquid in the collection pool 7 was collected every 2 months from March to October; and the collected liquid was filtered first, and then the liquid was evaporated, concentrated, and crystallized.

The particle diameter of the straw particles incorporated into the plough layer 1 is 10-20 mm, with an incorporating amount of 0.2 kg/m$^2$; the particle diameter of the straw biochar particles is 1.0-5.0 mm, with an incorporation ratio of 3.0% in the plough layer 1; the particle diameter of zeolite is 1.0-5.0 mm, and the particle diameter of diatomaceous earth is 0.1-1.5 mm; and the adding amounts of zeolite and diatomaceous earth are respectively 2% and 2.5% based on the total mass of the soil in the plough layer 1.

A raw material of the straw biochar particles is one of or more mixture of skin of corn straws, skin of sorghum straws, sesame straws, cotton straws, sunflower straws, and soybean straws.

The mixing mass ratio of the biochar powder, sodium bentonite, calcium bentonite, coal ash, and saline alkali soil in the impermeable layers 2 is 6.5:1.5:3.5:6.5:82; the viscosity of sodium bentonite is greater than 60 mPa·s, the residue on sieve of 75 μm particle diameter is less than 1.5%, and the filter loss is less than 14 cm$^3$, and the viscosity is measured at a rotating speed of 600 r/min through a test instrument; the fineness of the coal ash is less than 30%, the ignition loss is less than 8.0%, and the fineness of the coal ash is measured by a 45 μm square hole residue on sieve method; and the total mass fraction of silicon dioxide ($SiO_2$), aluminum oxide, and ferric oxide in the coal ash is greater than 70%, the mass fraction of free calcium oxide is less than 4%, and the mass fraction of sulfur trioxide is less than 3%.

The biochar powder raw material is one of or more mixture of pulp of corn straws, straw stalks, and wheat straws.

The grinding pressure of the impermeable layer 2 is 80 kPa, and the compacting factor thereof is 0.93-0.95.

The collecting layer 3 is formed by a nylon net II and a filler, the filler is placed in the nylon net II, the pore diameter of the nylon network II is 2-4 mm, and the paving thickness of the filler is 80 mm; and the filler is biochar with the particle diameter of 5-15 mm, and the biochar raw material is branches.

A method for preparing straw biochar particles for the above biological treatment method includes the following step: the straw biochar particles were prepared by pyrolyzing one of or more mixture of skin of corn straws, skin of sorghum straws, sesame straws, cotton straws, sunflower straws, and soybean straws at 500° C. for 2.0 h.

A method for preparing biochar powder for the above biological treatment method includes the following steps: the biochar powder was prepared by pyrolyzing the mixture of pulp of corn straws and wheat straws at 450° C. for 2.5 h, the biochar powder was crushed till the particle diameter was less than 0.5 mm, 30% woody biochar was incorporated into the biochar powder, the biochar powder was screened, and the biochar powder was mixed with charcoal powder with the particle diameter being less than 0.5 mm, where the woody biochar was prepared by pyrolyzing branches at 500° C. for 1.8 h.

A method for preparing the filler for the above biological treatment method includes the following steps: a raw material of the filler biochar in the collecting layer 3 was prepared first by pyrolyzing branches at 600° C. for 2.0 h; then, the raw material was modified with 0.1 mol/L potassium hydroxide for 32 h and the raw material was cleaned to be neutral, and the raw material was modified with a mixed solution of 0.02 mol/L potassium permanganate and 0.01 mol/L nitric acid for 35 h, the raw material was cleaned thoroughly, and the raw material was dried; and finally, the raw material was soaked in a mixed liquid of 4.5% of sodium bentonite and 3.0% of calcium bentonite for 30 h, and the raw material was cleaned and dried to prepare the filler.

With adoption of the solution in the embodiment, the water content of the soil is increased by 43.9%, the permeability (air permeability) of the soil is increased by 2.0 times, and the total salt content in the first year is decreased by 47.5%; the total salt content in the second year is decreased by 86.1% of an initial value, aboveground vegetations flourish, and the annual biomass is increased by 2.6 times or more; the osmotic coefficient of the impermeable layers 2 is less than $4\times10^{-11}$ m/s, and the anti-seepage capacity is strong; and the collection volume of salts (chloride salts and carbonates) by the collection pool 7 is 205 kg/1000 m$^2$, so that resource utilization is achieved.

Specific Embodiment IV

The embodiment is specifically described with reference to FIGS. 1-3. A structure for treating saline alkali soil described in the embodiment specifically includes a plough layer 1, impermeable layers 2, a collecting layer 3, and a saline alkali soil layer 4, where the collecting layer 3 is paved on the saline alkali soil layer 4, the collecting layer 3 is provided with a pipe network slot, and a collecting pipe network is arranged in the pipe network slot; the impermeable layers 2 are paved in an area corresponding to meshes of the collecting pipe network on the collecting layer 3, and the plough layer 1 is paved on the impermeable layers 2 and the collecting pipe network; the thickness of the impermeable layer 2 in each of the meshes is great in the middle and small in the periphery, with a slope surface inclining toward the collecting pipe network; a collection pool 7 is arranged in the collecting pipe network at an interval of every two adjacent mesh points, the collection pools 7 are arranged at positions of the mesh points, and the plurality of collection pools 7 are communicated with the collecting pipe network; and an inner side wall 8 of the collection pool 7 is subjected to anti-seepage treatment, and the upper end of the collection pool passes through the plough layer 1 and is opened.

The collecting pipe network includes a plurality of collecting pipes 6, a part of the collecting pipes 6 are transversely arranged, the other part of the collecting pipes 6 are longitudinally arranged, and the transversely arranged collecting pipes 6 and the longitudinally arranged collecting pipes 6 are connected; the spacing between two adjacent transverse collecting pipes 6 is 4.5 m, and the spacing between two adjacent longitudinal collecting pipes 6 is 9.0 m; the transverse spacing between two adjacent collection pools 7 is 9.0 m, and the longitudinal spacing thereof is 18 m; and the collecting pipes 6 are embedded, and axes of the collecting pipes 6 and the highest points of the impermeable layers 2 are located in a same horizontal plane.

The collecting pipe 6 is a screen pipe made from polyvinyl chloride (PVC), the diameter is 180 mm, the pore diameter of a screen pipe wall is 12 mm, and the hole spacing is 7 mm; and a nylon net I coats the screen pipe, and the pore diameter of the nylon net I is 4 mm.

The impermeable layer 2 has a slope toward a direction of the collecting pipe 6, with the slope being 0.9‰.

An impermeable underlayment 5 is arranged between the collecting pipe 6 and the collecting layer 3, and both sides of the impermeable underlayment 5 are in lap joint with the impermeable layer 2, with a lap joint length of 1.0 m; and the impermeable underlayment 5 is a sodium bentonite waterproof blanket, with a specification of 4500 g/m$^2$.

The side length of the collection pool 7 is 1.8 m, and the pool depth is 1.5 m; and the thickness of the plough layer 1 is 500 mm.

A biological treatment method using the above structure for treating saline alkali soil includes the following steps: a cleaned plough layer 1 was piled to one side, then a collecting layer 3 and impermeable layers 2 were paved in sequence, and a collecting pipe network and collection pools 7 were paved in the meantime; the impermeable layers 2 were prepared by mixing biochar powder, sodium bentonite, calcium bentonite, coal ash, and saline alkali soil and water was added for humidifying till the water content was 32%, and the above uniformly mixed components were paved in layers and ground, where the paving thickness of the first layer was 85 mm, and then the thickness of each layer was 50 mm, totaling 3 layers; straw particles, straw biochar particles, zeolite, and diatomaceous earth were incorporated into the plough layer 1 and the plough layer was restored to an original position; when the impermeable layers 2 were subjected to leakage after the collecting layer 3 operated 5 years or more, the collecting layer 3 was taken out and the collecting layer was placed in clean water to be soaked for 22 h, the collecting layer 3 was cleaned, and the solution and cleaning solution were aired after soaking, salt crystals were evaporated and concentrated, and the salt crystals were collected; the liquid in the collection pool 7 was collected every 2 months from March to October; and the collected liquid was filtered first, and then the liquid was evaporated, concentrated, and crystallized.

The particle diameter of the straw particles incorporated into the plough layer 1 is 10-20 mm, with an incorporating amount of 0.2 kg/m$^2$; the particle diameter of the straw biochar particles is 1.0-5.0 mm, with an incorporation ratio of 3.5% in the plough layer 1; the particle diameter of zeolite is 1.0-5.0 mm, and the particle diameter of diatomaceous earth is 0.1-1.5 mm; and the adding amounts of zeolite and diatomaceous earth are respectively 4.5% and 2.8% based on the total mass of the soil in the plough layer 1.

A raw material of the straw biochar particles is a mixture of skin of sorghum straws and sesame straws.

The mixing mass ratio of the biochar powder, sodium bentonite, calcium bentonite, coal ash, and saline alkali soil in the impermeable layers 2 is 4:1.5:2.5:2.5:89.5; the viscosity of sodium bentonite is greater than 60 mPa·s, the residue on sieve of 75 μm particle diameter is less than 1.5%, and the filter loss is less than 14 cm$^3$, and the viscosity is measured at a rotating speed of 600 r/min through a test instrument; the fineness of the coal ash is less than 30%, the ignition loss is less than 8.0%, and the fineness of the coal ash is measured by a 45 μm square hole residue on sieve method; and the total mass fraction of silicon dioxide ($SiO_2$), aluminum oxide, and ferric oxide in the coal ash is greater than 70%, the mass fraction of free calcium oxide is less than 4%, and the mass fraction of sulfur trioxide is less than 3%.

The biochar powder raw material is a mixture of straw stalks and wheat straws.

The grinding pressure of the impermeable layer 2 is 120 kPa, and the compacting factor thereof is 0.95-0.96.

The collecting layer 3 is formed by a nylon net II and a filler, the filler is placed in the nylon net II, the pore diameter of the nylon network II is 2-4 mm, and the paving thickness of the filler is 90 mm; and the filler is biochar with the particle diameter of 5-15 mm, and the biochar raw material is branches.

A method for preparing straw biochar particles for the above biological treatment method includes the following step: the mixture of skin of sorghum straws and sesame straws was pyrolyzed at 550° C. for 1.5 h.

A method for preparing biochar powder for the above biological treatment method includes the following steps: the biochar powder was prepared by pyrolyzing the mixture of straw stalks and wheat straws at 450° C. for 2.0 h, the biochar powder was crushed till the particle diameter was less than 0.5 mm, 23% woody biochar was incorporated into the biochar powder, the biochar powder was screened, and the biochar powder was mixed with charcoal powder with the particle diameter being less than 0.5 mm, where the woody biochar was prepared by pyrolyzing branches at 500° C. for 1.7 h.

A method for preparing the filler for the above biological treatment method includes the following steps: a raw material of the filler biochar in the collecting layer 3 was prepared first by pyrolyzing branches at 600° C. for 1.8 h; then, the raw material was modified with 0.08 mol/L potassium hydroxide for 42 h and the raw material was cleaned to be neutral, and the raw material was modified with a mixed solution of 0.03 mol/L potassium permanganate and 0.01 mol/L nitric acid for 56 h, the raw material was cleaned thoroughly, and the raw material was dried; and finally, the raw material was soaked in a mixed liquid of 4.8% of sodium bentonite and 1.5% of calcium bentonite for 35 h, and the raw material was cleaned and dried to prepare the filler.

With adoption of the solution in the embodiment, the water content of the soil is increased by 38.6%, the permeability (air permeability) of the soil is increased by 1.6 times, and the total salt content in the first year is decreased by 40.6%; the total salt content in the second year is decreased by 86.9% of an initial value, aboveground vegetations flourish, and the annual biomass is increased by 2.3 times or more; the osmotic coefficient of the impermeable layers 2 is less than $3\times10^{-11}$ m/s, and the anti-seepage capacity is strong; and the collection volume of salts (chloride salts and carbonates) by the collection pool 7 is 209 kg/1000 m$^2$, so that resource utilization is achieved.

Specific Embodiment V

The embodiment is specifically described with reference to FIGS. 1-3. A structure for treating saline alkali soil described in the embodiment specifically includes a plough layer 1, impermeable layers 2, a collecting layer 3, and a saline alkali soil layer 4, where the collecting layer 3 is paved on the saline alkali soil layer 4, the collecting layer 3 is provided with a pipe network slot, and a collecting pipe network is arranged in the pipe network slot; the impermeable layers 2 are paved in an area corresponding to meshes of the collecting pipe network on the collecting layer 3, and the plough layer 1 is paved on the impermeable layers 2 and the collecting pipe network; the thickness of the impermeable layer 2 in each of the meshes is great in the middle and small in the periphery, with a slope surface inclining toward the collecting pipe network; a collection pool 7 is arranged in the collecting pipe network at an interval of every two adjacent mesh points, the collection pools 7 are arranged at positions of the mesh points, and the plurality of collection pools 7 are communicated with the collecting pipe network; and an inner side wall 8 of the collection pool 7 is subjected to anti-seepage treatment, and the upper end of the collection pool passes through the plough layer 1 and is opened.

The collecting pipe network includes a plurality of collecting pipes 6, a part of the collecting pipes 6 are transversely arranged, the other part of the collecting pipes 6 are longitudinally arranged, and the transversely arranged collecting pipes 6 and the longitudinally arranged collecting pipes 6 are connected; the spacing between two adjacent transverse collecting pipes 6 is 3.5 m, and the spacing between two adjacent longitudinal collecting pipes 6 is 7.0 m; the transverse spacing between two adjacent collection pools 7 is 7.0 m, and the longitudinal spacing thereof is 14 m; and the collecting pipes 6 are embedded, and axes of the collecting pipes 6 and the highest points of the impermeable layers 2 are located in a same horizontal plane.

The collecting pipe 6 is a screen pipe made from polyvinyl chloride (PVC), the diameter is 200 mm, the pore diameter of a screen pipe wall is 15 mm, and the hole spacing is 8 mm; and a nylon net I coats the screen pipe, and the pore diameter of the nylon net I is 5 mm.

The impermeable layer 2 has a slope toward a direction of the collecting pipe 6, with the slope being 0.7‰.

An impermeable underlayment 5 is arranged between the collecting pipe 6 and the collecting layer 3, and both sides of the impermeable underlayment 5 are in lap joint with the impermeable layer 2, with a lap joint length of 1.2 m; and the impermeable underlayment 5 is a sodium bentonite waterproof blanket, with a specification of 5100 g/m$^2$.

The side length of the collection pool 7 is 1.9 m, and the pool depth is 1.5 m; and the thickness of the plough layer 1 is 450 mm.

A biological treatment method using the above structure for treating saline alkali soil includes the following steps: a cleaned plough layer 1 was piled to one side, then a collecting layer 3 and impermeable layers 2 were paved in sequence, and a collecting pipe network and collection pools 7 were paved in the meantime; the impermeable layers 2 were prepared by mixing biochar powder, sodium bentonite, calcium bentonite, coal ash, and saline alkali soil and water was added for humidifying till the water content was 30.5%, and the above uniformly mixed components were paved in layers and ground, where the paving thickness of the first layer was 95 mm, and then the thickness of each layer was 45 mm, totaling 3 layers; straw particles, straw biochar particles, zeolite, and diatomaceous earth were incorporated into the plough layer 1 and the plough layer was restored to an original position; when the impermeable layers 2 were subjected to leakage after the collecting layer 3 operated 5 years or more, the collecting layer 3 was taken out and the collecting layer was placed in clean water to be soaked for 16.5 h, the collecting layer 3 was cleaned, and the solution and cleaning solution were aired after soaking, salt crystals were evaporated and concentrated, and the salt crystals were collected; the liquid in the collection pool 7 was collected every 2 months from March to October; and the collected liquid was filtered first, and then the liquid was evaporated, concentrated, and crystallized.

The particle diameter of the straw particles incorporated into the plough layer 1 is 10-20 mm, with an incorporating amount of 0.18 kg/m$^2$; the particle diameter of the straw biochar particles is 1.0-5.0 mm, with an incorporation ratio of 2.5% in the plough layer 1; the particle diameter of zeolite is 1.0-5.0 mm, and the particle diameter of diatomaceous earth is 0.1-1.5 mm; and the adding amounts of zeolite and diatomaceous earth are respectively 2.8% and 1.5% based on the total mass of the soil in the plough layer 1.

A raw material of the straw biochar particles is a mixture of cotton straws and soybean straws.

The mixing mass ratio of the biochar powder, sodium bentonite, calcium bentonite, coal ash, and saline alkali soil in the impermeable layers 2 is 4.5:1.0:3.0:5.0:86.5; the viscosity of sodium bentonite is greater than 60 mPa·s, the residue on sieve of 75 μm particle diameter is less than 1.5%, and the filter loss is less than 14 cm$^3$, and the viscosity is measured at a rotating speed of 600 r/min through a test instrument; the fineness of the coal ash is less than 30%, the ignition loss is less than 8.0%, and the fineness of the coal ash is measured by a 45 μm square hole residue on sieve method; and the total mass fraction of silicon dioxide ($SiO_2$), aluminum oxide, and ferric oxide in the coal ash is greater than 70%, the mass fraction of free calcium oxide is less than 4%, and the mass fraction of sulfur trioxide is less than 3%.

The biochar powder raw material is a mixture of straw stalks and wheat straws.

The grinding pressure of the impermeable layer 2 is 110 kPa, and the compacting factor thereof is 0.94-0.95.

The collecting layer 3 is formed by a nylon net II and a filler, the filler is placed in the nylon net II, the pore diameter of the nylon network II is 2-4 mm, and the paving thickness of the filler is 60 mm; and the filler is biochar with a particle diameter of 5-15 mm, and the biochar raw material is wood.

A method for preparing straw biochar particles for the above biological treatment method includes the following step: the mixture of skin of cotton straws and soybean straws was pyrolyzed at 550° C. for 1.5 h.

A method for preparing biochar powder for the above biological treatment method includes the following steps: the biochar powder was prepared by pyrolyzing the mixture of straw stalks and wheat straws at 400° C. for 2.5 h, the biochar powder was crushed till the particle diameter was less than 0.5 mm, 26% woody biochar was incorporated into the biochar powder, the biochar powder was screened, and the biochar powder was mixed with charcoal powder with the particle diameter being less than 0.5 mm, where the woody biochar was prepared by pyrolyzing branches at 520° C. for 1.6 h.

A method for preparing the filler for the above biological treatment method includes the following steps: a raw material of the filler biochar in the collecting layer 3 was prepared first by pyrolyzing wood at 550° C. for 2.5 h; then, the raw material was modified with 0.05 mol/L potassium hydroxide for 48 h and the raw material was cleaned to be neutral, and the raw material was modified with a mixed solution of 0.001 mol/L potassium permanganate and 0.005 mol/L nitric acid for 72 h, the raw material was cleaned thoroughly, and the raw material was dried; and finally, the raw material was soaked in a mixed liquid of 3.2% of sodium bentonite and 2.2% of calcium bentonite for 23 h, and the raw material was cleaned and dried to prepare the filler.

With adoption of the solution in the embodiment, the water content of the soil is increased by 36.3%, the permeability (air permeability) of the soil is increased by 2.3 times, and the total salt content in the first year is decreased by 32.1%; the total salt content in the second year is decreased by 81.9% of an initial value, aboveground vegetations flourish, and the annual biomass is increased by 1.8 times or more; the osmotic coefficient of the impermeable layers 2 is less than $5\times10^{-11}$ m/s, and the anti-seepage capacity is strong; and the collection volume of salts (chloride salts and carbonates) by the collection pool 7 is 161.5 kg/1000 $m^2$, so that resource utilization is achieved.

To sum up the above embodiments, according to a structure for treating saline alkali soil and a biological treatment method provided by the disclosure, a biological material compound preparation is used as the permeable layer material; a cohesive body is formed by means of interactions between the biochar powder with a high ash content and clay particles in sodium bentonite, calcium bentonite, coal ash, and saline alkali soil; under the grinding action, the anti-seepage capacity, strength, and plasticity are significantly improved; the tested osmotic coefficient is lower than $5\times10^{-11}$ m/s, and root systems of plants hardly damage the layer; because the use level of added materials is low, and the added materials are conventional materials, so that the cost is low; the permeable layers are good in durability, the anti-seepage capacity of the permeable layers of the soil is increased by 2-3 times compared with that in a conventional method using only biochar, the cost is reduced by 50%, the durability is improved by 1 time or more, and the saline alkali soil layer is effectively prevented from moving upward, so that the salt content in the plough layer is continuously reduced, and it is guaranteed that the soil in the layer is effectively improved;

according to a structure for treating saline alkali soil and a biological treatment method provided by the disclosure, salts in the upper plough layer and the lower saline alkali soil layer are collected by arranging the collecting pipe network and the collection pools, so that harmful salts are permanently removed; recovery in the collecting layer is after a long-term operation (5 years or more); when the permeable layers fail and are remediated, adsorbed and crystallized salts in the collecting layer are recovered as an industrial production raw material; the collecting layer has physical and chemical adsorptive action on salt components included in the soil, so that the collecting layer is strong in effect of removing the salts in the soil; the method effectively remediates the saline alkali soil by using the cheap biomass material without bringing new pollutants; and the salts are collected with relatively high economic benefits, so that the problem that industrial production related raw materials are short is solved; and according to a structure for treating saline alkali soil and a biological treatment method provided by the disclosure, the plough layer is improved by using the compound conditioners (straw particles, straw biochar particles, zeolite particles, and diatomaceous earth particles), and the water retaining property, permeability, and the organic matter content of the soil are improved, which further contributes to growth of plants; under the action of rainfall, the salts in the plough layer are collected through the pipelines and the collection pools, so that the salt content in the soil is reduced rapidly; the saline alkali soil in the plough layer is treated with a comprehensive method which solves the technical problem that the removal efficiency of salts in the saline alkali soil with different degrees of salinization is low, the salt content in the soil is reduced, and the air permeability and the water retaining capacity of the soil are improved; under the action of rainfall for two years, the harmful salt content in the soil is reduced by over 80%, the water retaining capacity is improved by 30%, and the air permeability (permeability) of the soil is improved by 70% or more.

The objects, technical solutions, and beneficial effects of the disclosure are further described in detail in the above specific examples. It shall be understood that the above is merely the specific examples of the disclosure, rather than limiting the disclosure and may further be a rational combination of features recorded in the embodiments. Any modifications, equivalent replacements, improvements and the like made within the spirit and principle of the disclosure shall be covered in the protection scope of the disclosure.

What is claimed is:

1. A biological treatment method for treating saline alkali soil comprising the following steps: piling a cleaned plough layer (1) to one side, then paving a collecting layer (3) and impermeable layers (2) in sequence, and paving a collecting pipe network and collection pools (7) in the meantime; the impermeable layers (2) being prepared by mixing biochar powder, sodium bentonite, calcium bentonite, coal ash, and saline alkali soil and adding water for humidifying till the water content is 25-35%, and paving the above uniformly mixed components in layers and grinding the same, wherein the paving thickness of the first layer is 80-100 mm, and then the thickness of each layer is 40-50 mm with the totaling 2-3 layers; incorporating straw particles, straw biochar particles, zeolite, and diatomaceous earth into the plough layer (1) and restoring the plough layer to an original position; when the impermeable layers (2) are subjected to leakage after the collecting layer (3) operates 5 years or more, taking out the collecting layer (3) and placing the collecting layer in clean water to be soaked for 12-24 hours, cleaning the collecting layer (3), and airing the solution and cleaning solution after soaking, evaporating and concentrating salt crystals, and collecting the salt crystals; collecting the liquid in the collection pool (7) every 2 months from March to October; and filtering the collected liquid first, and then evaporating, concentrating, and crystallizing the liquid.

2. The biological treatment method using the structure for treating saline alkali soil according to claim 1, wherein the particle diameter of the straw particles incorporated into the plough layer (1) is 10-20 mm, with an incorporating amount of 0.15-0.3 kg/$m^2$; the particle diameter of the straw biochar particles is 1.0-5.0 mm, with an incorporation ratio of 2.0-5.0% in the plough layer (1); the particle diameter of zeolite is 1.0-5.0 mm, and the particle diameter of diatomaceous earth is 0.1-1.5 mm; and the adding amounts of zeolite and diatomaceous earth are respectively 0.5-5.0% and 0.5-3.0% based on the total mass of the soil in the plough layer (1).

3. The biological treatment method using the structure for treating saline alkali soil according to claim 2, wherein a raw material of the straw biochar particles is one of or more mixture of skin of corn straws, skin of sorghum straws, sesame straws, cotton straws, sunflower straws, and soybean straws.

4. The biological treatment method using the structure for treating saline alkali soil according to claim 1, wherein the mixing mass ratio of the biochar powder, sodium bentonite, calcium bentonite, coal ash, and saline alkali soil in the impermeable layers (2) is 3:0.5:1.0:2.0:93.5-6.5:1.5:3.5:6.5:82; the viscosity of sodium bentonite is greater than 60 mPa·s, the residue on sieve of 75 μm particle diameter is less than 1.5%, and the filter loss is less than 14 $cm^3$; the fineness of coal ash is less than 30%, and the ignition loss is less than 8.0%; and the total mass fraction of silicon dioxide, aluminum oxide, and ferric oxide in the coal ash is greater than 70%, the mass fraction of free calcium oxide is less than 4%, and the mass fraction of sulfur trioxide is less than 3%.

5. The biological treatment method using the structure for treating saline alkali soil according to claim 4, wherein the biochar powder raw material is one of or more mixture of pulp of corn straws, straw stalks, and wheat straws.

6. The biological treatment method using the structure for treating saline alkali soil according to claim 1, wherein the grinding pressure of the impermeable layer (2) is 50-150 kPa, and the compacting factor thereof is 0.92-0.96.

7. The biological treatment method using the structure for treating saline alkali soil according to claim 1, wherein the collecting layer (3) is formed by a nylon net II and a filler, the filler is placed in the nylon net II, the pore diameter of the nylon network II is 2-4 mm, and the paving thickness of the filler is 50-100 mm; and the filler is biochar with the particle diameter of 5-15 mm, and the biochar raw material is wood.

* * * * *